United States Patent
Naoe

(10) Patent No.: US 12,186,677 B2
(45) Date of Patent: Jan. 7, 2025

(54) INFORMATION PROVISION DEVICE, INFORMATION PROVISION METHOD, AND INFORMATION PROVISION PROGRAM

(71) Applicant: JUNGLE X CORP., Tokyo (JP)

(72) Inventor: Fumitada Naoe, Minato-ku (JP)

(73) Assignee: JUNGLE X CORP., Tokyo (JP)

( * ) Notice: Subject to any disclaimer, the term of this patent is extended or adjusted under 35 U.S.C. 154(b) by 130 days.

(21) Appl. No.: 17/468,131

(22) Filed: Sep. 7, 2021

(65) Prior Publication Data

US 2021/0402286 A1    Dec. 30, 2021

Related U.S. Application Data

(63) Continuation of application No. PCT/JP2020/025436, filed on Jun. 29, 2020.

(30) Foreign Application Priority Data

Jul. 12, 2019    (JP) .................. 2019-130124

(51) Int. Cl.
*A63F 9/18*     (2006.01)
*A63F 11/00*    (2006.01)

(52) U.S. Cl.
CPC .......... *A63F 9/183* (2013.01); *A63F 11/0051* (2013.01); *A63F 11/0074* (2013.01);
(Continued)

(58) Field of Classification Search
CPC .. A63F 9/183; A63F 11/0051; A63F 11/0074; A63F 2011/0097; A63F 2250/1063
(Continued)

(56) References Cited

U.S. PATENT DOCUMENTS 8,543,905 B2 *  9/2013 Migos .................. G06F 3/0488
                                                       715/208
2004/0143840 A1   7/2004 Fukuda et al.
(Continued)

FOREIGN PATENT DOCUMENTS

JP    2004272301 A    9/2004
JP    2008132878 A    6/2008
(Continued)

OTHER PUBLICATIONS

International Search Report issued on Sep. 24, 2020 in corresponding International Application No. PCT/JP2020/025436; 4 pages.

*Primary Examiner* — Omkar A Deodhar
(74) *Attorney, Agent, or Firm* — Maier & Maier, PLLC

(57) ABSTRACT

An information provision device in an information provision system includes, as its functions: a score control circuit that increases or decreases a provision timing score on the occurrence of a predetermined action; a timing determination circuit that determines the coming of the time to provide quiz information if the provision timing score exceeds a predetermined threshold; a priority control circuit that determines or changes, based on the situation of, e.g., a sport game on each occurrence of an action, priority associated with text information from which quiz information is generated; a quiz information generation circuit that generates appropriate quiz information based on the situation of, e.g., the sport game at the time determined; and a quiz information provision circuit that provides the generated quiz information to a user.

7 Claims, 10 Drawing Sheets

(52) U.S. Cl.
CPC ............... *A63F 2011/0097* (2013.01); *A63F 2250/1063* (2013.01)

(58) Field of Classification Search
USPC .......................................................... 463/9
See application file for complete search history.

(56) References Cited

U.S. PATENT DOCUMENTS

| | | |
|---|---|---|
| 2010/0081120 A1 | 4/2010 | Nanjiani et al. |
| 2013/0149681 A1 | 6/2013 | Tinkler et al. |
| 2013/0157245 A1* | 6/2013 | Basu ................. G09B 7/02 |
| | | 434/362 |
| 2013/0224718 A1 | 8/2013 | Woodward |
| 2013/0303290 A1 | 11/2013 | Nishiya et al. |
| 2014/0080110 A1* | 3/2014 | Nguyen ................ G09B 7/00 |
| | | 434/362 |

FOREIGN PATENT DOCUMENTS

| | | | |
|---|---|---|---|
| JP | 2010005154 A | 1/2010 | |
| JP | 2013236716 A | 11/2013 | |
| JP | 2013236906 A | 11/2013 | |
| JP | 2014083340 A | 5/2014 | |
| JP | 2016224584 A | 12/2016 | |
| JP | 2018182591 A | 11/2018 | |
| WO | WO-2012067782 A1 * | 5/2012 | ............. A63F 13/10 |

* cited by examiner

- PLAYER OO
  - WHO
    - A PLAYER IN JAPANESE PROFESSIONAL BASEBALL
- 2009
  - WHEN  ← THIS ELEMENT IS ASKED
    - A SEASON OF JAPANESE PROFESSIONAL BASEBALL
    - LATE 2000s A.D.
- TEAM XX
  - WHERE
    - A TEAM IN JAPANESE PROFESSIONAL BASEBALL
- JOINED
  - WHAT
    - TRANSFER BETWEEN TEAMS

WHEN DID THE PLAYER OO JOIN THE TEAM XX?

INFORMATION PROVISION DEVICE, INFORMATION PROVISION METHOD, AND INFORMATION PROVISION PROGRAM

FIELD

The present disclosure relates to an information provision device, an information provision method, and an information provision program for providing quiz information corresponding to an event being held.

BACKGROUND

Some game services provide real-time quiz information in connection with the situation of an event being held, for example a game of a sport, shogi, or go; the quiz information asks a user's prediction on the development of the event. Because a user of such a game service can enjoy the quiz information while watching the event such as a sport game, the quiz information will advantageously draw attention to the sport.

For example, Patent Literature 1 discloses a system that provides quiz information in connection with an event. On the occurrence of a particular situation in the event, the system provides choices representing predictions on a subsequent situation. As an example, between innings (a particular situation) in a baseball game (an event), the system provides quiz information that asks a prediction on a coach's command to be issued immediately after the transition to the next inning.

Patent Literature

Patent Literature 1: Japanese Patent Laid-Open No. 2014-083340

SUMMARY

In addition to quiz information asking a prediction on the development of an event such as a sport game, such a game service provides quiz information asking knowledge corresponding to the situation of the event, for example knowledge about a player who is going to step into the batter's box in a baseball game. Because a user can enjoy such quiz information while watching the event such as a sport game, such quiz information will also achieve the above advantage, i.e., drawing attention to the sport. Further, such quiz information will deepen the user's knowledge about the sport, thereby making the user like the sport more.

Providing such quiz information asking knowledge requires, first of all, monitoring the situation of the event such as a sport game and providing appropriate quiz information. As above, quiz information asks knowledge about a player who is going to step into the batter's box in a baseball game. Providing such quiz information is not simple because the baseball game needs to be monitored to be able to address circumstances such as pinch-hitting and player substitution.

Quiz information corresponding to a particular situation of the event such as a sport game also needs to be provided at an appropriate time to the user so as not to prevent the user's immersion into, e.g., the sport game. In the above example, if quiz information is provided to the user after the player steps into the batter's box in the baseball game, the user may feel it disturbing to watching the game. The baseball game thus needs to be monitored in real time to determine an appropriate time to provide quiz information.

Some personnel may monitor the situation of the event such as a sport game directly or through TV broadcasting, but this is unrealistic for addressing various sport games.

In view of the above, the present disclosure describes an information provision device, an information provision method, and an information provision program that enable providing, at an appropriate time, quiz information appropriate for the situation of an event such as a sport game.

An aspect of the present disclosure is an information provision device that provides quiz information corresponding to an event to a user. The device includes: a timing determination circuit that determines a time to provide the quiz information during the event; a quiz information generation circuit that generates the quiz information appropriate for the time based on a situation of the event at the time; and a quiz information provision circuit that provides the quiz information to the user at the time.

Another aspect of the present disclosure is an information provision method for providing quiz information corresponding to an event to a user. The method includes: a timing determination step performed by a timing determination circuit to determine a time to provide the quiz information during the event; a quiz information generation step performed by a quiz information generation circuit to generate the quiz information appropriate for the time based on a situation of the event at the time; and a quiz information provision step performed by a quiz information provision circuit to provide the quiz information to the user at the time.

Yet another aspect of the present disclosure is an information provision program for providing quiz information corresponding to an event to a user. The program causes a computer to perform: a timing determination step of determining a time to provide the quiz information during the event; a quiz information generation step of generating the quiz information appropriate for the time based on a situation of the event at the time; and a quiz information provision step of providing the quiz information to the user at the time.

According to the present disclosure, quiz information appropriate for the time to provide the quiz information in an event is generated based on the situation of the event at the time. This enables providing quiz information appropriate for the situation of the event such as a sport game. The time to provide the quiz information during the event is also determined. This enables providing the quiz information at a time appropriate for the situation of the event such as a sport game. Advantageously, the quiz information will draw attention to the sport, and further deepen a user's knowledge to make the user like the sport more.

DETAILED DESCRIPTION

Embodiments of the present disclosure will be described below with reference to the drawings. The embodiments below are not intended to unnecessarily limit the scope of the present disclosure set forth in the claims. Not all of the elements illustrated in the embodiments are essential to the present disclosure.

First Embodiment

<Configurations>

Figure 1:
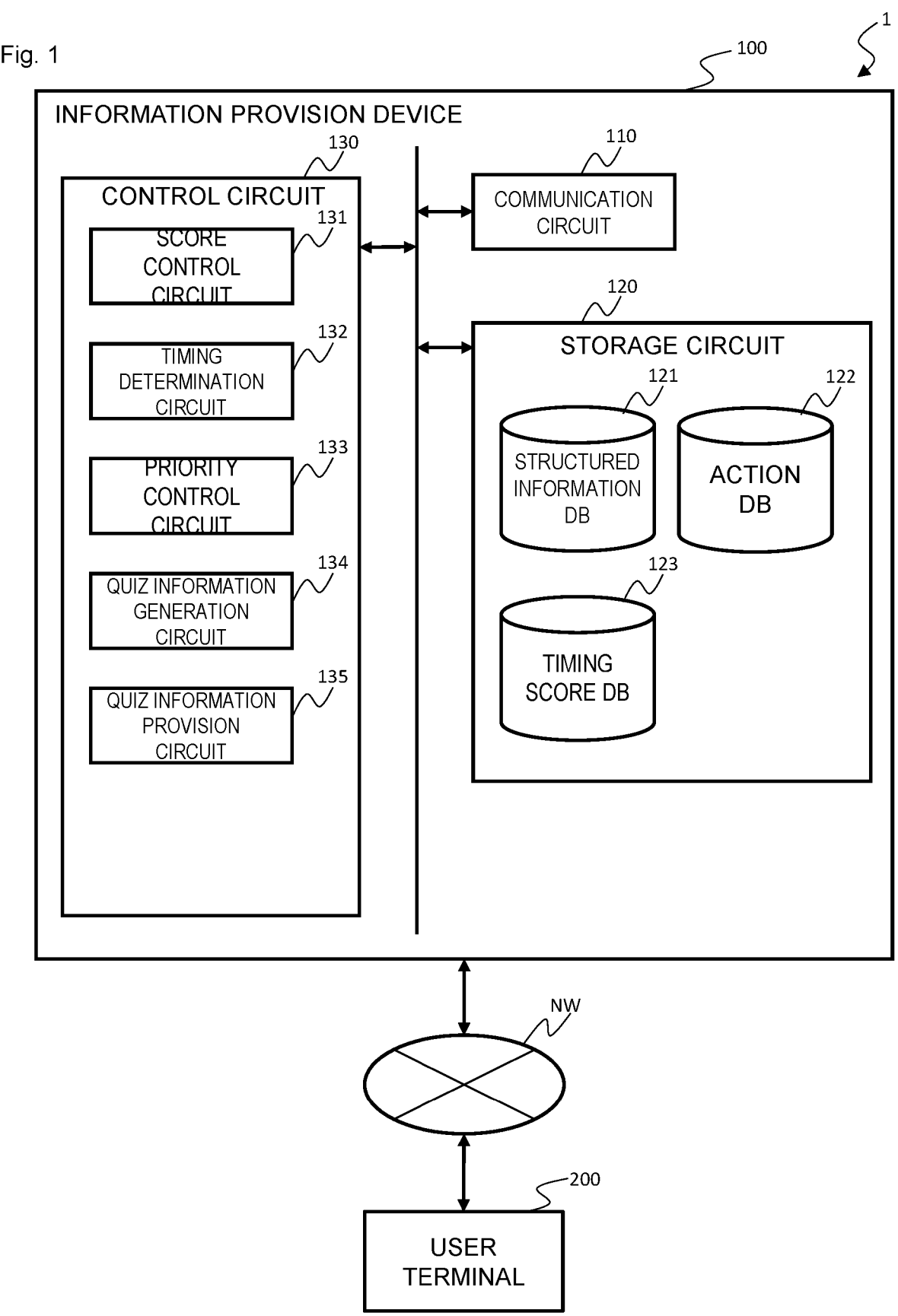
FIG. 1 is a functional block configuration diagram showing an information provision system according to an embodiment of the present disclosure.

FIG. 1 is a functional block configuration diagram showing an information provision system 1 according to a first embodiment of the present disclosure. As an example and not as a limitation, the information provision system 1 provides quiz information corresponding to the situation of an event being held, such as a game of a sport, shogi, or go, to a user.

For example, the quiz information provided by the information provision system 1 asks knowledge corresponding to the situation of a game of a sport, shogi, or go. Specifically, in a baseball game, quiz information asking a question about a player "When did the player OO join the team XX?" is provided when the player is going to step into the batter's box. In a shogi game, quiz information asking a question about a player, for example "What is the first title acquired by the ninth-degree player ΔΔ?" is provided when the player begins to ponder his next move.

Such quiz information may be in the form of choices, for example "1: 2008, 2: 2009, 3: 2010, 4: other" from which the user selects an answer, or may be in the form in which the user directly enters an answer. Users who answered correctly to the quiz information or who answered to multiple pieces of quiz information with a high correct answer rate may be given a predetermined reward, for example, points usable for purchasing goods.

The information provision system 1 includes an information provision device 100, a user terminal 200, and a network NW. The information provision device 100 and the user terminal 200 is interconnected over the network NW. The network NW is implemented by communication networks for performing communication, including, as an example and not as a limitation, the Internet, an intranet, a local area network (LAN), a wide area network (WAN), a wireless LAN (WLAN), a wireless WAN (WWAN), and a virtual private network (VPN).

The information provision device 100 determines, in response to a user's log in to the information provision system from the user terminal 200, the time to provide quiz information to the user terminal 200, and generates and provides the quiz information. As an example and not as a limitation, the information provision device 100 may be implemented by devices that provide various web services, including a computer (such as a desktop computer, a laptop computer, or a tablet computer) and a server device. The server device is not limited to a stand-alone server device but may be a distributed server system that cooperatively operates through communication over the network NW, or may be a cloud server.

The user terminal 200 is a device that receives user-entered answers to quiz information. As an example and not as a limitation, the user terminal 200 is implemented by a smartphone, a mobile terminal, or a computer (such as a desktop computer, a laptop computer, or a tablet computer). An application for receiving a service of the information provision system 1 is installed in the user terminal 200, or alternatively, a URL for accessing the information provision device 100 is set in the user terminal 200. Tapping or double-clicking the application icon or the URL activates the application or the URL to start the service.

The information provision device 100 includes a communication circuit 110, a storage circuit 120, and a control circuit 130.

The communication circuit 110, which is a communication interface for wired or wireless communication with the user terminal 200 over the network NW, may use any communication protocol capable of communication with the user terminal 200. As an example and not as a limitation, the communication circuit 110 uses communication protocols such as Transmission Control Protocol/Internet Protocol (TCP/IP) to perform communication.

The storage circuit 120 stores programs and input data for performing various control processes and for carrying out functions of the control circuit 130. As an example and not as a limitation, the storage circuit 120 is implemented by memory including random access memory (RAM) and read only memory (ROM), or storage including a hard disk drive (HDD), a solid state drive (SSD), and a flash memory. The storage circuit 120 also stores a structured information DB 121, an action DB 122, and a timing score DB 123. Further, the storage circuit 120 temporarily stores data involved in communication with the user terminal 200, and data generated in processing to be described later.

The structured information DB (structured information) 121 stores text information that includes sentences describing knowledge and events related to, e.g., a sport. The text information is stored in a structured form for generating quiz information. As an example and not as a limitation, the structured (annotated) form is a form in which the text information is broken down on a clause basis into words in clauses and into element tags indicating which of elements such as "when," "where," "who," and "what" the clauses represent. Annotating in this manner is for facilitating the generation of quiz information by a quiz information generation circuit 134 to be described below. A sufficient number of pieces of annotated text information for regularly providing quiz information are stored for each genre, such as a sport game, a shogi game, or a go game, for which quiz information is to be provided.

The structured information DB 121 also stores information indicating priorities for generating quiz information, for example, values and ranks, associated with the text information. The priorities are determined or changed by a priority control circuit 133 to be described below so that actually generated quiz information suits the situation of, e.g., a game of a sport, shogi, or go.

In this embodiment, quiz information is generated using the structured information DB 121 that stores, in a structured form, the text information including sentences describing knowledge and events related to, e.g., a sport. However, the database does not need to store text information in a structured form. For example, words extracted from text information including sentences describing knowledge and events related to, e.g., a sport may be stored in a database, from which only words may be extracted to generate quiz information.

The action DB 122 stores action information indicating situations of, e.g., a game of a sport, shogi, or go. The action information is used to determine whether the time appropriate for providing quiz information has come. The time to provide quiz information is desirably a time at which providing quiz information does not disturb the user watching, e.g., a sport. For example, the time is between innings or when the next player is going to step into the batter's box in a baseball game, or when one of the players in a game of shogi or go begins to ponder the next move.

By contrast, a time undesirable for providing quiz information is, for example, when one of the teams in a soccer game moves to the other team's side (the attacking third) and can score a goal. The action DB 122 stores information indicating such actions (such as transition between innings, pondering the next move, and attacking in the attacking third) for each genre for which quiz information is to be provided, along with their respective values by which a provision timing score (to be described below) is increased or decreased.

The timing score DB 123 stores a provision timing score, which is an indicator value used to determine the time to provide quiz information as described above. To provide quiz information at an appropriate time, the information provision device 100 uses the indicator value called a provision timing score to manage the time to provide the quiz information. The provision timing score is increased at times desirable for providing quiz information as described above, and is decreased at times undesirable for providing quiz information as described above. When the provision timing score exceeds a predetermined threshold, quiz information is provided.

For example, the provision timing score is low immediately after the start of a game or immediately after the provision of quiz information, and then increased over time. On the occurrence of an action stored in the action DB 122, the provision timing score is increased or decreased by the value stored for the action. Controlling the provision timing score in this manner prevents too frequent or infrequent provision of quiz information, and allows quiz information to be provided at a time when providing the quiz information does not disturb the user watching, e.g., a sport. The timing score DB 123 stores the provision timing score, along with the above predetermined threshold, for each of events such as games of a sport, shogi, or go in which quiz information is to be provided.

The control circuit 130 controls the general operation of the information provision device 100 by executing programs stored in the storage circuit 120. As an example and not as a limitation, the control circuit 130 is implemented by devices including a central processing circuit (CPU), a micro processing circuit (MPU), a graphics processing circuit (GPU), a microprocessor, a processor core, a multiprocessor, an application-specific integrated circuit (ASIC), and a field programmable gate array (FPGA). The control circuit 130 includes, as its functions, a score control circuit 131, a timing determination circuit 132, the priority control circuit 133, the quiz information generation circuit 134, and a quiz information provision circuit 135. The score control circuit 131, the timing determination circuit 132, the priority control circuit 133, the quiz information generation circuit 134, and the quiz information provision circuit 135 are activated by a program stored in the storage circuit 120 and are executed in the information provision device 100.

The score control circuit 131 monitors the situation of, e.g., a game of a sport, shogi, or go in real time. On the occurrence of a predetermined action stored (set) in the action DB 122, the score control circuit 131 increases or decreases a provision timing score stored in the timing score DB 123 by a value stored in the action DB 122, thereby controlling the time to provide quiz information.

The score control circuit 131 monitors, e.g., a sport game in the following manner. For example, the score control circuit 131 obtains imaging data resulting from imaging the situation of the game of a sport, shogi, or go directly from a camera installed in the game site, or through TV broadcasting or an Internet video-sharing website, and subjects the imaging data to image analysis or speech analysis. Model information for image analysis or speech analysis (not shown) may be stored in the storage circuit 120. During a certain period in which quiz information may be reasonably provided, for example, halftime in a soccer game, the score control circuit 131 may increase the provision timing score by a predetermined value.

The score control circuit 131 may also monitor, e.g., a sport game in the following manner. For example, the score control circuit 131 may obtain text information on the situation of the game of a sport, shogi, or go from a predetermined web page that reports the game in real time as text information. As an example and not as a limitation, the provision timing score may be increased or decreased by statistical processing based on situations of past games of a sport, shogi, or go, for example, according to a machine learning algorithm.

The timing determination circuit 132 determines the time to provide quiz information during, e.g., a game of a sport, shogi, or go. Specifically, if the provision timing score stored in the timing score DB 123 and controlled by the score control circuit 131 exceeds the predetermined threshold, the timing determination circuit 132 determines the coming of the time to provide quiz information. The predetermined threshold is set according to the number of times or frequency of providing quiz information for each of events such as games of a sport, shogi, or go in which quiz information is to be provided, and is stored in the timing score DB 123.

The timing determination circuit 132 may also determine the coming of the time to provide quiz information during, e.g., a game of a sport, shogi, or go on the occurrence of a particular action identified from the situation of the game of a sport, shogi, or go. That is, quiz information may be unconditionally provided on the occurrence of the particular action irrespective of the value of the provision timing score controlled by the score control circuit 131.

The priority control circuit 133 determines or changes, based on the situation of, e.g., a game of a sport, shogi, or go on each occurrence of an action, a priority associated with the text information stored in the structured information DB 121. For example, this priority is a value or rank indicating the priority of generating quiz information as described above, and is determined or changed so that actually generated quiz information suits the situation of, e.g., a game of a sport, shogi, or go. For this purpose, the result of monitoring, e.g., a sport game by the score control circuit 131 may be used. According to the situation as described above, the priority of text information for one piece of quiz information may be raised to the highest priority, or the priorities of text information for multiple pieces of quiz information may be raised to the highest priority. As an example and not as a limitation, the priority may be determined or changed by statistical processing based on past quiz information provision states, for example, according to a machine learning algorithm. The statistical processing or the machine learning may refer to user response information to be described below.

After the quiz information provision circuit 135 to be described later provides quiz information, the priority control circuit 133 may change the priority based on user response information for the quiz information provided. The user response information here is one or more pieces of information about users' responses and answers. As an example and not as a limitation, the user response information is a concept that includes the number of responses, the number of answers, the response rate, the answer rate, and the response timing of the users, and the attributes of users who responded. The structured information DB 121 therefore may store the users' response rate and answer rate, for example, for each element tag.

The quiz information generation circuit 134 generates appropriate quiz information from the text information stored in the structured information DB 121 based on the situation of, e.g., a game of a sport, shogi, or go at the time determined by the timing determination circuit 132. To generate appropriate quiz information, the quiz information generation circuit 134 generates quiz information from a piece of text information having the highest priority determined or changed by the priority control circuit 133.

The quiz information, generated by the quiz information generation circuit 134 based on the situation of, e.g., a game of a sport, shogi, or go at the time determined by the timing determination circuit 132, is then provided to the user. The quiz information provision circuit 135 transmits the quiz information to the user terminal 200 via the communication circuit 110. The user operates the user terminal 200 to receive the quiz information and enter and transmit the user's answer.

Figure 2:
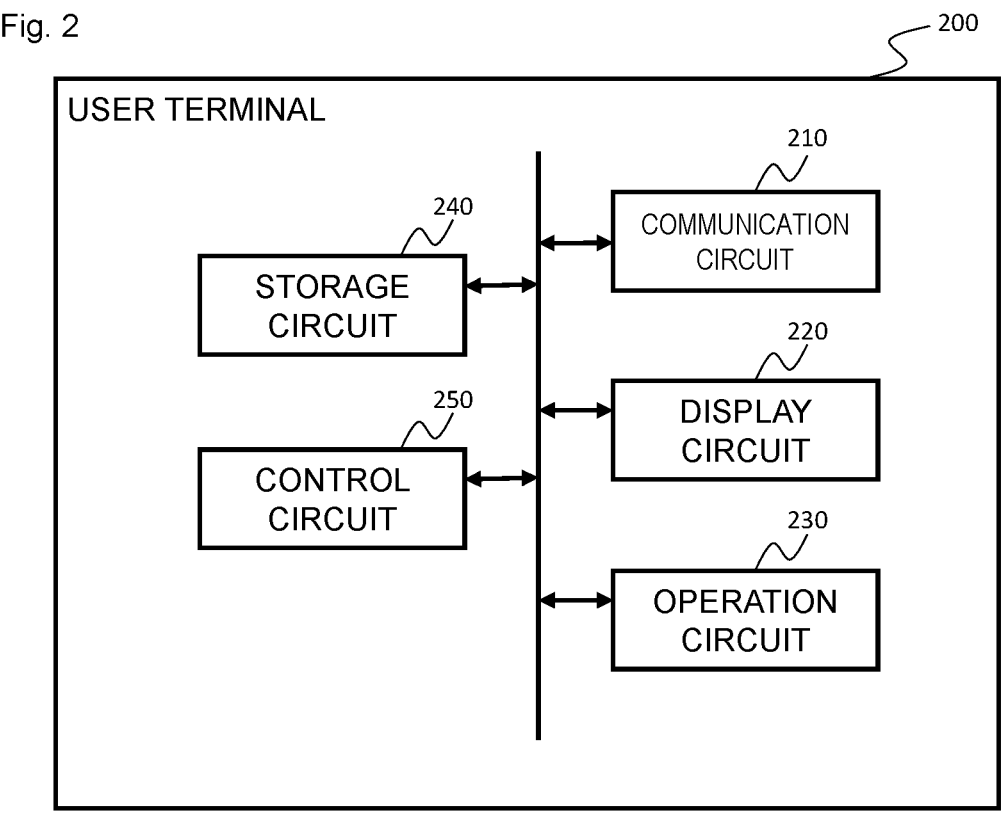
FIG. 2 is a functional block configuration diagram showing a user terminal 200 in FIG. 1.

FIG. 2 is a functional block configuration diagram showing the user terminal 200 in FIG. 1. The user terminal 200 includes a communication circuit 210, a display circuit 220, an operation circuit 230, a storage circuit 240, and a control circuit 250.

The communication circuit 210, which is a communication interface for wired or wireless communication with the information provision device 100 over the network NW, may use any communication protocol capable of communication with the information provision device 100. As an example and not as a limitation, the communication circuit 210 uses communication protocols such as TCP/IP to perform communication.

The display circuit 220, which is a user interface used for displaying the details of user-input operations and for displaying data transmitted from the information provision device 100, is implemented by a liquid crystal display. The display circuit 220 displays quiz information provided by the quiz information provision circuit 135.

The operation circuit 230, which is a user interface used by the user to input operation instructions, is implemented by a keyboard, a mouse, or a touch screen. The operation circuit 230 is used to enter answers to quiz information provided by the quiz information provision circuit 135.

The storage circuit 240 stores programs and input data for performing various control processes and for carrying out functions of the control circuit 250. As an example and not as a limitation, the storage circuit 240 is implemented by memory including RAM and ROM, or storage including an HDD, an SSD, and a flash memory. The storage circuit 240 also temporarily stores data involved in communication with the information provision device 100.

The control circuit 250 controls the general operation of the user terminal 200 by executing programs stored in the storage circuit 240. As an example and not as a limitation, the control circuit 250 is implemented by devices including a CPU, an MPU, a GPU, a microprocessor, a processor core, a multiprocessor, an ASIC, and an FPGA.

<Flow of Process>

Figure 3:
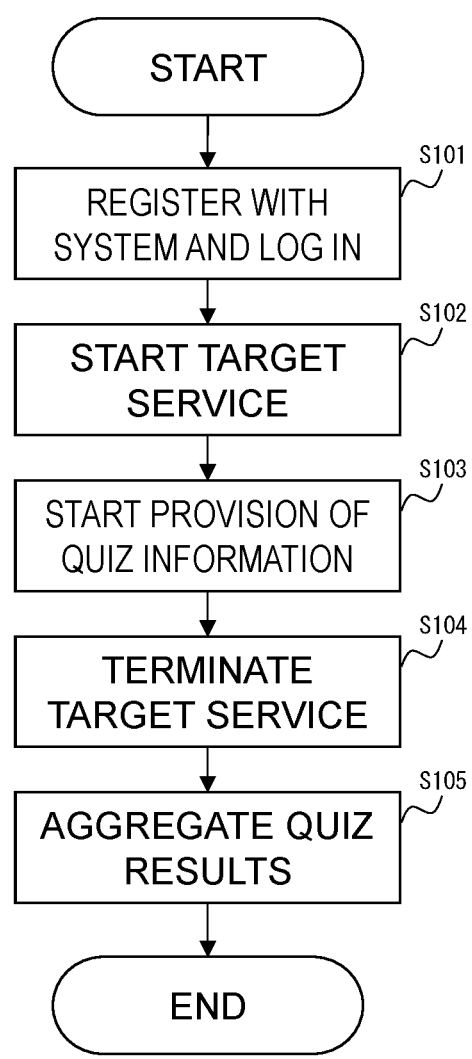
FIG. 3 is a flowchart showing the operations of the entire process in an information provision device 100 in FIG. 1.

The following will describe the flow of the process of an exemplary information provision method performed by the information provision device 100 in the information provision system 1. First, the flow of the entire process performed by the information provision device 100 will be described with reference to FIG. 3. FIG. 3 is a flowchart showing the operations of the entire process in the information provision device 100 in FIG. 1.

As processing at step S101, the information provision device 100 authenticates the user as a receiver of quiz information from the information provision system 1. For example, the user is requested to enter account information and a password on the user terminal 200. The information entered through the user's operations is checked against registered information to authenticate the user. If the information entered matches the registered information, the user is allowed to log in to the information provision device 100.

As processing at step S102, for example, the user operates the user terminal 200 to select, e.g., a game of a sport, shogi, or go in which quiz information is to be provided by the information provision device 100. Once the game is selected, the service of providing quiz information is started. Because the provision of quiz information is typically started at or immediately before the start of the game, the game is selected at step S102 before the start of the game. However, the game may be selected after the start of the game.

As processing at step S103, the provision of quiz information is started at a predetermined time, for example, when the game is started. Processing at step S201 shown in FIG. 4 to be described below is performed.

Figure 4:
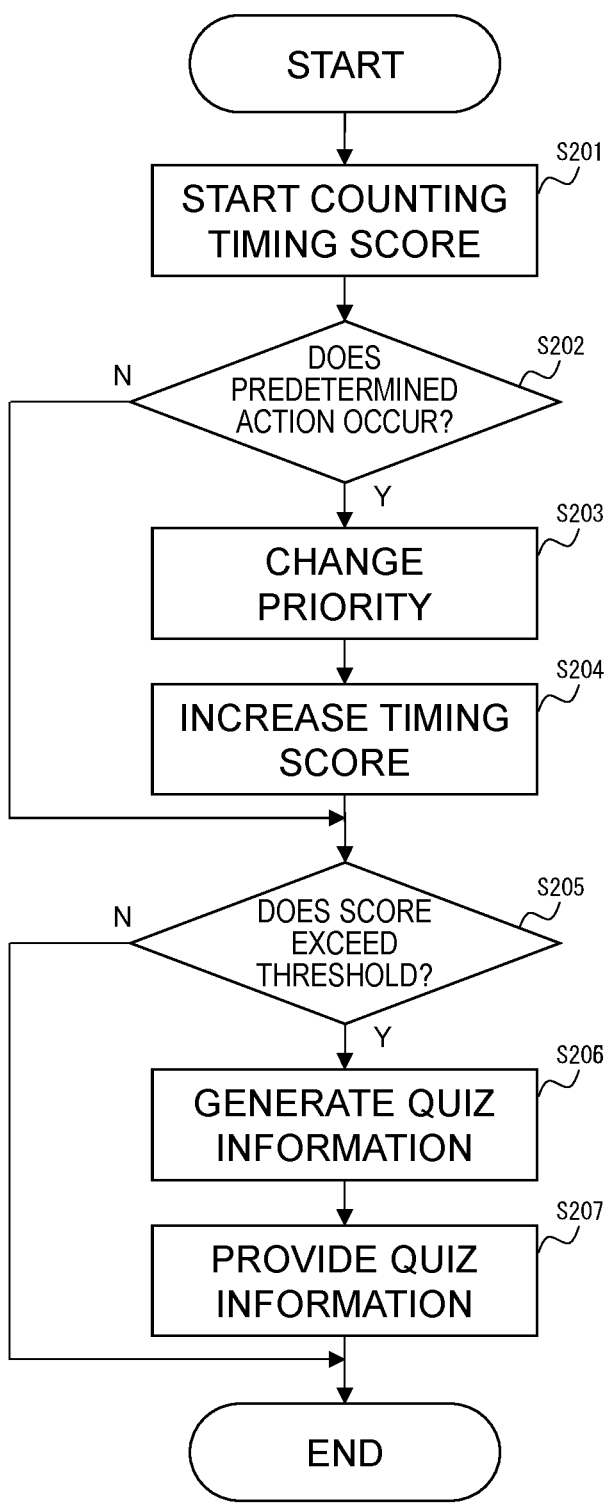
FIG. 4 is a flowchart showing the operations of the process of providing information in the information provision device 100 in FIG. 1.

The flow of the information provision method will now be described with reference to FIG. 4. FIG. 4 is a flowchart showing the operations of providing information in the information provision device 100 in FIG. 1. The flowchart shown in FIG. 4 indicates the flow of providing, or failing to provide, a piece of quiz information and terminating the process. This process is repeated to determine, until the end of the game, whether to provide quiz information.

As processing at step S201, the score control circuit 131 monitors the situation of the user-selected game of, e.g., a sport, shogi, or go in real time by analyzing imaging data or by obtaining text information. The score control circuit 131 starts counting the provision timing score for the game stored in the timing score DB 123, and increases the provision timing score over time at a predetermined rate.

Figure 5:
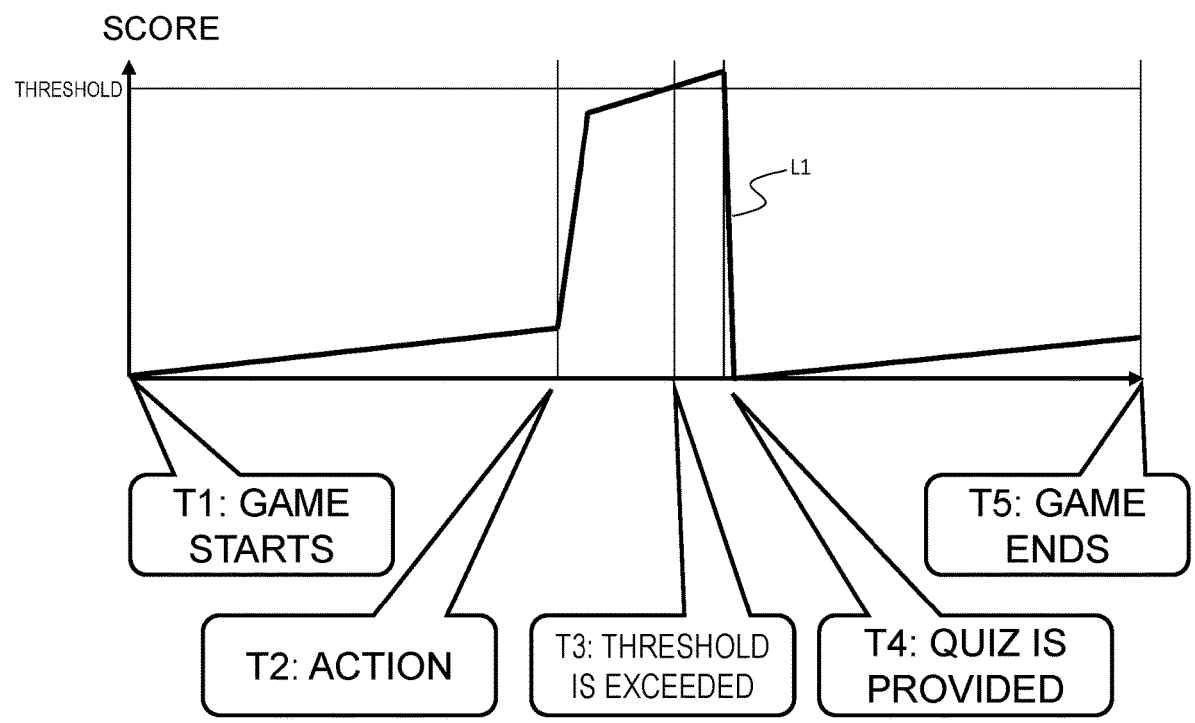
FIG. 5 is a graph showing an example of increases and decreases of a timing score controlled by a score control circuit 131 in FIG. 1.

FIG. 5 is a graph showing an example of increases and decreases of the timing score controlled by the score control circuit 131 in FIG. 1. A broken line L1 indicates the provision timing score in the timing score DB 123 over time. For example, at time T1 shown in FIG. 5 at which the game starts, the provision timing score is zero as indicated by the broken line L1. The provision timing score then gradually increases over time.

For example, at the start of the game, the user is likely to be immersed in the game. The score control circuit 131 therefore controls the provision timing score to be zero and gradually increased over time, as shown in FIG. 5. The rate of the increase over time, that is, the inclination of the broken line L1 shown in FIG. 5, may be adjusted so that, for example, at least one piece of quiz information is provided during the game. Although not described in this embodiment, quiz information may be provided immediately before the start of the game.

As processing at step S202, the score control circuit 131 monitors the situation of the game of, e.g., a sport, shogi, or go in real time to determine whether a situation corresponding to a predetermined action stored in the action DB 122 occurs. As described above, a predetermined action is an action that causes the provision timing score to be increased or decreased, such as transition between innings or the next player stepping into the batter's box in a baseball game, one of the teams moving to the other team's side in a soccer game, or one of the players beginning to ponder the next move in a game of shogi or go. If a predetermined action occurs (Y at step S202), the next processing at step S203 is performed. Otherwise (N at step S202), processing at step S205 is performed.

As processing at step S203, based on the situation of the action determined to be occurring at step S202, the priority control circuit 133 determines or changes a priority associated with the text information stored in the structured information DB 121. For example, if the identified action corresponds to the next player stepping into the batter's box in a baseball game, the priority associated with a piece of text information on the next player is increased.

As processing at step S204, the score control circuit 131 increases or decreases the provision timing score stored in the timing score DB 123 by the value stored in the action DB 122. For example, if the identified action corresponds to the next player stepping into the batter's box in a baseball game, this processing increases the likelihood that quiz information on the next player will be provided.

For example, at time T2 shown in FIG. 5 at which the action occurs, the provision timing score sharply rises to near the threshold, as indicated by the broken line L1. The provision timing score is now more likely to exceed the threshold in response to a cause such as a further increase in the provision timing score over time. In the above example of the next player stepping into the batter's box in a baseball game, the provision timing score is more likely to exceed the threshold to cause quiz information to be provided.

As processing at step S205, the timing determination circuit 132 determines whether the provision timing score in the timing score DB 123 exceeds the predetermined threshold during the game of, e.g., a sport, shogi, or go. If the provision timing score exceeds the predetermined threshold at step S205, the coming of the time to provide quiz information is determined, and quiz information is provided in the following processing. If so (Y at step S205), processing at next step S206 is performed. Otherwise (N at step S205), the process terminates. Once the process terminates, the process returns to the processing at step S201 if the game is not finished.

For example, at time T3 shown in FIG. 5 at which the threshold is exceeded, step S205 is performed to determine the coming of the time to provide quiz information. Quiz information is then generated as described below, and, at time T4 to provide quiz information, the quiz information is provided.

As processing at step S206, the quiz information generation circuit 134 generates appropriate quiz information from the text information in the structured information DB 121 at the time determined at step S205. At this point, the quiz information is generated from a piece of text information having the highest priority determined or changed at step S203. If multiple pieces of text information have the same priority, the quiz information generation circuit 134 may randomly select one of the pieces of text information.

Figure 6:
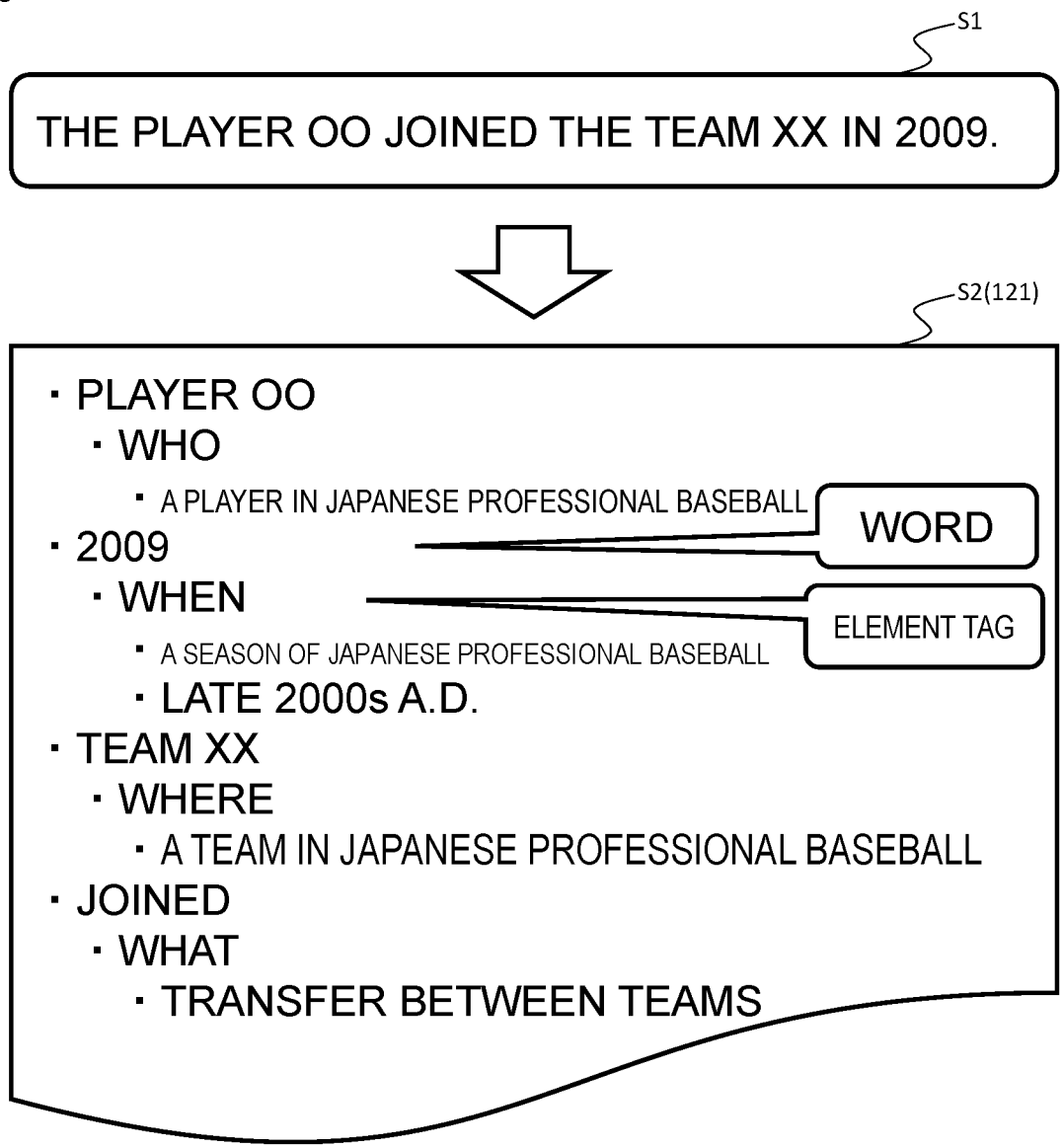
FIG. 6 is a schematic diagram showing exemplary data stored in a structured information DB 121 in FIG. 1.

FIG. 6 is a schematic diagram showing exemplary data stored in the structured information DB 121 in FIG. 1. The following will describe annotated text information stored in the structured information DB 121, from which quiz information is generated at step S206.

Text information S1 includes a sentence describing knowledge or an event related to, e.g., a sport or shogi, from which quiz information is generated. As shown in FIG. 6, the text information S1 includes a sentence, for example, "The player OO joined the team XX in 2009." Structured information S2 in FIG. 6 shows the text information S1 annotated by breaking down the text information S1 on a clause basis into words in clauses and into element tags indicating which of elements such as "when," "where," "who," and "what" the clauses represent. The structured information S2 is stored in this form in the structured information DB 121.

The structured information S2 shown in FIG. 6 includes words such as "player OO," "2009," "team XX," and "joined" (each of them is not a word in a general sense, but is regarded as a word in this embodiment), the abovementioned elements represented by clauses including these words, and element tags that include phrases describing the elements. For example, the word "player OO" is assigned "who" as an element, and assigned "a player in Japanese professional baseball" as a phrase describing the element. The element, and the phrase describing the element, are associated as an element tag with the word "player OO." This facilitates machine processing of the text information S1, which is a normal sentence.

Figure 7:
FIG. 7 is a schematic diagram showing an example of generating quiz information by a quiz information generation circuit 134 in FIG. 1.

FIG. 7 is a schematic diagram showing an example of generating quiz information by the quiz information generation circuit 134 in FIG. 1. The generation of quiz information at step S206 will now be described with reference to the structured information S2 in FIG. 6. The structured information S2 shown in FIG. 7 is the same as the one shown in FIG. 6.

The quiz information generation circuit 134 randomly selects, from the structured information S2 shown in FIG. 7, an element to be asked by quiz information to be generated. The example shown in FIG. 7 assumes that quiz information asking the element "when" is to be generated. In this case, a sentence is generated in which only the clause associated with the element to be asked takes a question form and the other clauses are generated according to grammar. This yields a sentence asking a question to be answered with the word associated with the element, as indicated by quiz information S3. In this manner, a large amount of grammatically natural quiz information can be readily generated. Along with the question sentence, choices such as "1: 2008, 2: 2009, 3: 2010, 4: other" may be generated by, for example, randomly listing the correct information and close-to-correct information.

As processing at step S207, the quiz information provision circuit 135 transmits the quiz information generated at step S206 to the user terminal 200 via the communication circuit 110 at the time determined at step S205. The process of providing quiz information then terminates. If the game is not finished, the process returns to the processing at step S201.

As processing at step S104 shown in FIG. 3, the service of providing quiz information terminates at the end of the game or at the end of a predetermined time limit.

As processing at step S105, for example, the information provision device 100 aggregates the results of the quiz information. For example, the user's response rate and answer rate for the quiz information provided are aggregated and stored in the structured information DB 121. The aggregated results are used for determining or changing priorities in future provision of quiz information.

<Advantageous Effects>

As above, the information provision device and the information provision method according to this embodiment involve storing a provision timing score for each game of, e.g., a sport, shogi, and go, and increasing or decreasing the provision timing score based on the situation of the game. If the provision timing score exceeds a predetermined threshold, quiz information is provided. The provision timing score may be based on, for example, a machine learning algorithm. The quiz information can thus be provided at an appropriate time corresponding to the situation of, e.g., a sport game. This enables the quiz information to be provided at a time when providing the quiz information does not disturb the user watching the sport, and the quiz information will draw attention to the sport.

Structured information from which the quiz information is generated is stored in association with priorities. The priorities are determined or changed based on the situation of the game of, e.g., a sport, shogi, or go. The priorities may be determined or changed by statistical processing, for example, according to a machine learning algorithm. At the appropriate time, quiz information is generated based on a piece of structured information with the highest priority, so that quiz information appropriate for the time can be generated. The quiz information will thus deepen the user's knowledge to make the user like the sport more.

Further, the quiz information is generated based on the structured (annotated) text information that includes sentences describing knowledge and events related to, e.g., the sport. Thus, a sufficient number of pieces of quiz information to be regularly provided to the user can be automatically generated. This can prevent the user from getting tired of similar quiz information provided repeatedly.

Second Embodiment

Figure 8:
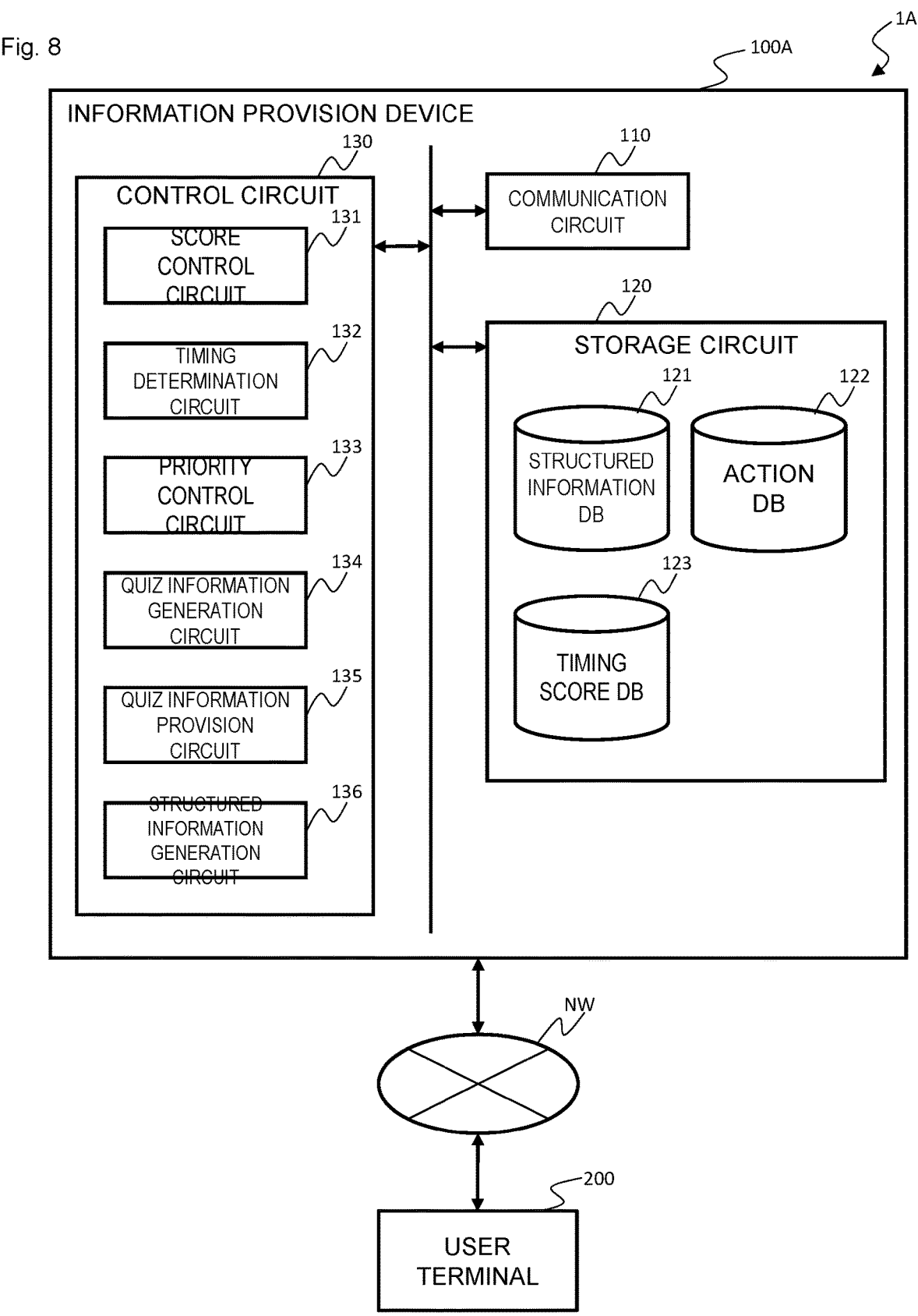
FIG. 8 is a functional block configuration diagram showing an information provision system according to an embodiment of the present disclosure.

FIG. 8 is a functional block configuration diagram showing an information provision system 1A according to a second embodiment of the present disclosure. The information provision system 1A is the same as the information provision system 1 according to the first embodiment in that the system provides quiz information corresponding to the situation of an event being held, for example, a game of a sport, shogi, or go, to a user. However, the information provision system 1A is different from the information provision system 1 according to the first embodiment in that the control circuit 130 of an information provision device 100A in this embodiment includes, as its function, a structured information generation circuit 136. Other configurations and the flow of the process are the same as in the first embodiment.

In addition to the functions in the first embodiment, this embodiment includes the function of collecting and annotating text information including sentences describing knowledge and events related to, e.g., a sport. The text information is stored in the structured information DB 121.

The structured information generation circuit 136 collects and obtains text information including sentences describing knowledge and events related to, e.g., a sport, and annotates the text information for generating quiz information. The text information is stored in the structured information DB 121. For example, the text information may be collected from imaging data analyzed and text information, which are obtained for monitoring the situation of a game of, e.g., a sport, shogi, or go by the score control circuit 131. The text information may also be collected from a predetermined web page that shows information on the result of the game of, e.g., a sport, shogi, or go, and other related information (such as player-related information, e.g., team transfer information, and team-related information). The collected information is annotated as described above and stored in the structured information DB 121.

In addition to the advantageous effects of the first embodiment, this embodiment has the following advantageous effect. Text information that includes sentences describing knowledge and events related to, e.g., a sport is collected, and quiz information is generated from the text information collected. Thus, a sufficient number of pieces of quiz information to be regularly provided to the user can be automatically generated, and quiz information on fresh information, such as information on a new player who has just joined the team, can be promptly generated. This can prevent the user from getting tired of similar quiz information provided repeatedly.

Third Embodiment

Figure 9:
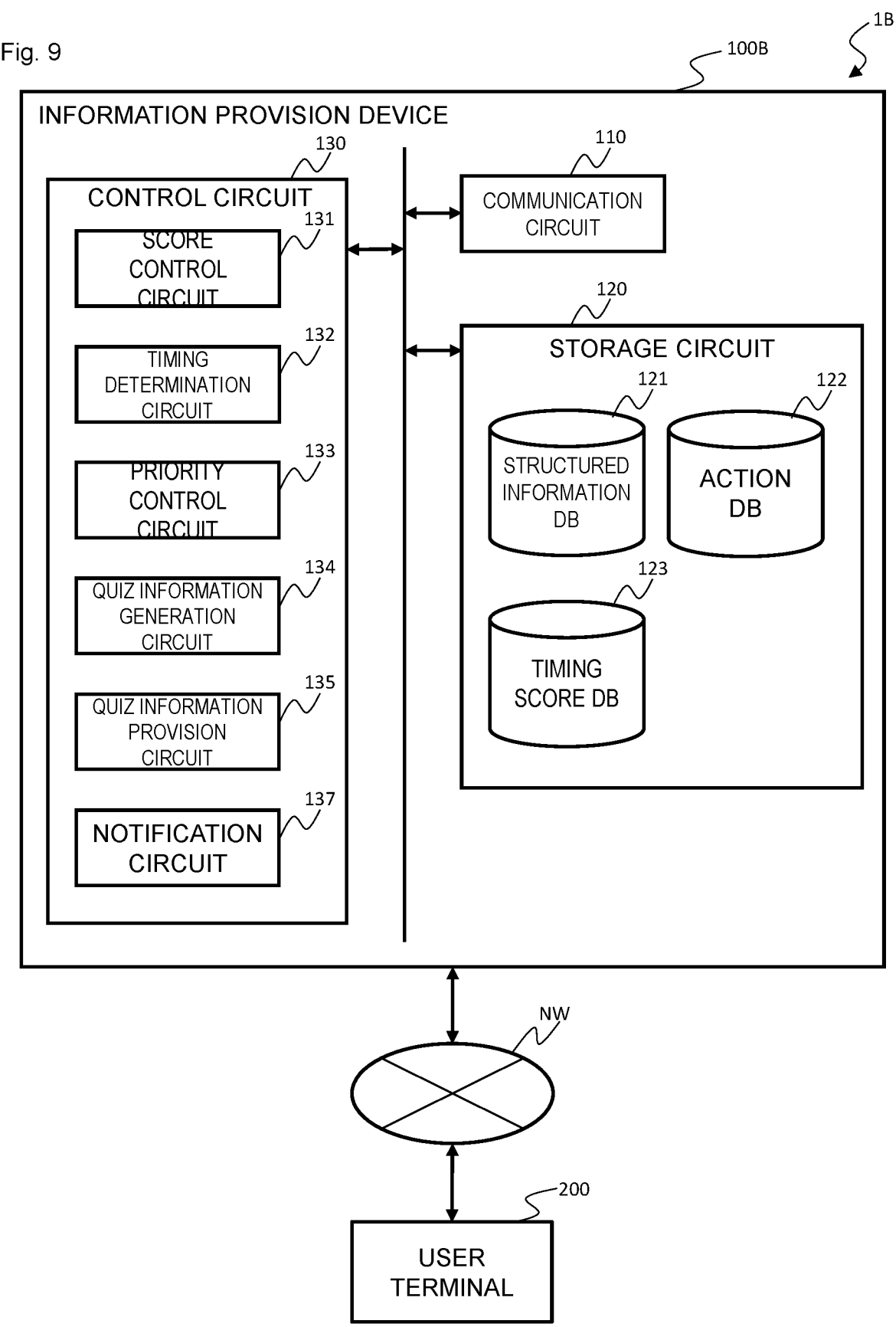
FIG. 9 is a functional block configuration diagram showing an information provision system according to an embodiment of the present disclosure.

FIG. 9 is a functional block configuration diagram showing an information provision system 1B according to a third embodiment of the present disclosure. The information provision system 1B is the same as the information provision system 1 according to the first embodiment in that the system provides quiz information corresponding to the situation of an event being held, for example, a game of a sport, shogi, or go, to a user. However, the information provision system 1B is different from the information provision system 1 according to the first embodiment in that the control circuit 130 of an information provision device 100B in this embodiment includes, as its function, a notification circuit 137. Other configurations and the flow of the process are the same as in the first embodiment.

In addition to the functions in the first embodiment, this embodiment includes the function of aggregating the results of quiz information and notifying an external entity of the aggregated results.

The quiz information generation circuit 134 in this embodiment generates quiz information based on the situation of a game of, e.g., a sport, shogi, or go at a time determined by the timing determination circuit 132. The quiz information generated asks users to predict the development of the game of, e.g., a sport, shogi, or go from the situation of the game.

The results of the users' answers to the quiz information provided by the quiz information provision circuit 135 are aggregated. The notification circuit 137 notifies an external device (not shown) of the aggregated results by transmitting the results to the external device via the communication circuit 110. The external device that receives the notification from the notification circuit 137 is, for example, a device accessible to a person concerned, such as a player or coach participating in a sport game in which the quiz information is provided. That is, the system has the function of providing a real-time notification of the results of the quiz information to a relevant person participating in the game.

In this embodiment, the users answer quiz information that asks the users to predict the development of, e.g., a sport game from the situation of the game. A relevant person participating in the game is notified of the aggregated results of the answers in real time, so that the relevant person can refer to the aggregated results for the subsequent play. For example, the aggregated results can be referred to by a coach to change players, or can be referred to for directing the coach to change players. This enables the users to watch the game with a stronger sense of unity between the team and the users.

In addition to the advantageous effects of the first embodiment, this embodiment has the following advantageous effect. Quiz information is generated that asks users to predict the development of, e.g., a sport game from the situation of the game. The results of answers to the quiz information are aggregated and provided to an external device, so that a relevant person participating in the game is notified of the aggregated results in real time. The relevant person can thus refer to the aggregated results for the subsequent play. Because the users' answers are reflected on the sport game in real time, the users can watch the game with a stronger sense of unity between the team and the users.

Fourth Embodiment (Program)

Figure 10:
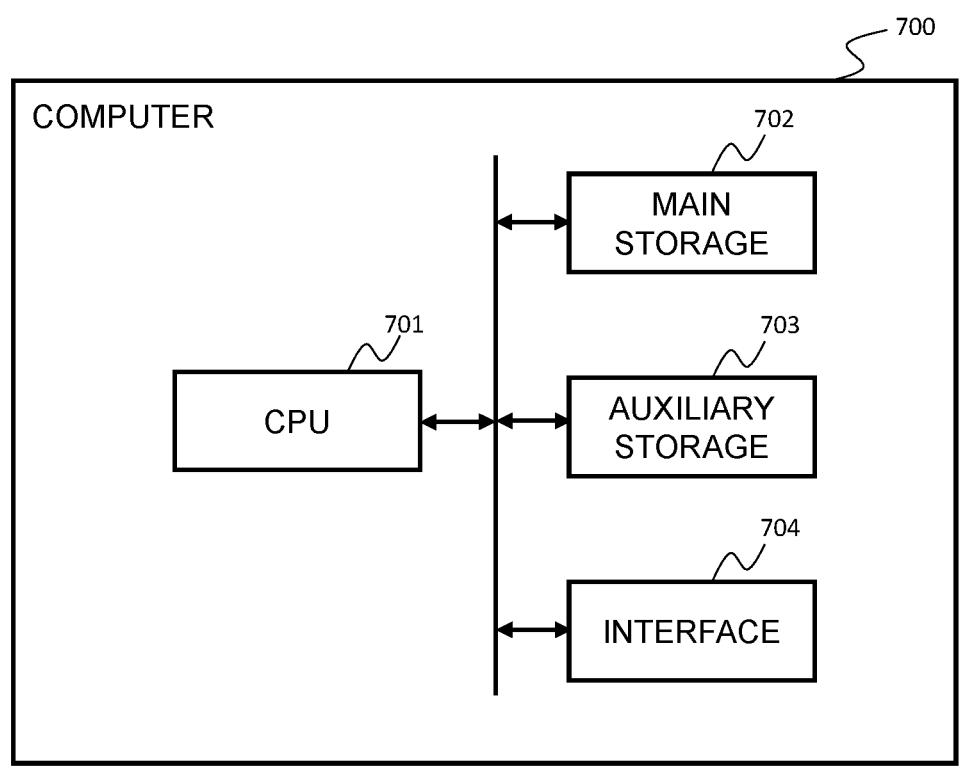
FIG. 10 is a functional block configuration diagram showing a computer 700 according to an embodiment of the present disclosure.

FIG. 10 is a functional block configuration diagram showing an exemplary configuration of a computer 700. The computer 700 includes a CPU 701, a main storage 702, an auxiliary storage 703, and an interface 704.

The following will describe the details of a control program (an information provision program) for carrying out the functions of the score control circuit 131, the timing determination circuit 132, the priority control circuit 133, the quiz information generation circuit 134, the quiz information provision circuit 135, the structured information generation circuit 136, and the notification circuit 137 according to the first to third embodiments. These functional blocks are implemented in the computer 700. The operations of these components are stored in the form of a program in the auxiliary storage 703. The CPU 701 reads the program from the auxiliary storage 703 and loads the program into the main storage 702, and performs the above-described processing according to the program. The CPU 701 allocates, according to the program, a storage area for the above-described storage circuit in the main storage 702.

Specifically, the program is a control program that causes the computer 700 to perform: a timing determination step of determining a time to provide quiz information during an event; a quiz information generation step of generating the quiz information appropriate for the time based on the situation of the event at the time; and a quiz information provision step of providing the quiz information to a user at the time.

The auxiliary storage 703 is an example of a non-transitory tangible medium. Other examples of the non-transitory tangible medium include a magnetic disk, a magneto-optical disk, a CD-ROM, a DVD-ROM, and semiconductor memory, connected via the interface 704. If the program is distributed to the computer 700 over the network, the computer 700 having received the program may load the program into the main storage 702 and perform the above-described processing.

The program may be a program for carrying out some of the above-described functions. Further, the program may be what is called a differential file (a differential program) that carries out the above-described functions in combination with other programs stored in the auxiliary storage 703.

While embodiments of the present disclosure have been described, these embodiments may be carried out in various other forms and allow various eliminations, substitutions, and modifications. These embodiments, their variations, and the embodiments with eliminations, substitutions, and modifications made are within the technical scope of the claims and the scope of their equivalents.

REFERENCE SIGNS LIST

1, 1A, 1B information provision system
100, 100A, 100B information provision device
110 communication circuit
120 storage circuit
121 structured information DB
122 action DB
123 timing score DB
130 control circuit
131 score control circuit
132 timing determination circuit
133 priority control circuit
134 quiz information generation circuit
135 quiz information provision circuit
136 structured information generation circuit
137 notification circuit
200 user terminal
210 communication circuit
220 display circuit
230 operation circuit
240 storage circuit
250 control circuit
NW network

The invention claimed is:

1. An information provision device that provides quiz information corresponding to an event to a user, comprising:
a timing determination circuit that determines a time to provide the quiz information during the event;
a quiz information generation circuit that generates the quiz information by extracting words related to the event from a database storing the structured information being annotated with the words and element tags indicating element types of the words in the text information extracted from event-related text, information constructed for generating the quiz information, appropriate for the time based on a situation of the event at the time;
a quiz information provision circuit that provides the quiz information to the user at the time; and
a priority control circuit that determines or changes a value or rank indicating the priority of generating quiz information, based on the situation of the event, priority of an element tag corresponding to a question for generating the quiz information;
wherein user response information indicating the user's response to the quiz information provided to the user is stored in the structured information for each element tag associated with the quiz information,
the priority control circuit changes the priority of the element tag based on the user response information,
wherein the quiz information generation circuit generates the quiz information asking a question to be answered with a word corresponding to a high-priority element tag.

2. The information provision device according to claim 1, wherein the quiz information generation circuit generates the quiz information by generating a sentence asking a question to be answered with one or more of the words corresponding to one or more of the element tags in the text information.

3. The information provision device according to claim 1, wherein the priority control circuit increases priority of an element tag corresponding to an action occurring in the event.

4. The information provision device according to claim 2, comprising a structured information generation circuit that obtains and structures predetermined set text information, thereby generating and updating the structured information.

5. The information provision device according to claim 4, wherein the quiz information is related to an action occurring in the event, or to a person causing an action to occur in the event.

6. The information provision device according to claim 4, wherein the quiz information asks a prediction on an action expected to occur in the event.

7. The information provision device according to claim 6, comprising a notification circuit that notifies a person concerned with the event of the user's answer to the quiz information provided to the user.

* * * * *